Dec. 7, 1943.　　　　A. C. FISCHER　　　　2,336,235
STRUCTURAL UNIT
Filed April 22, 1940
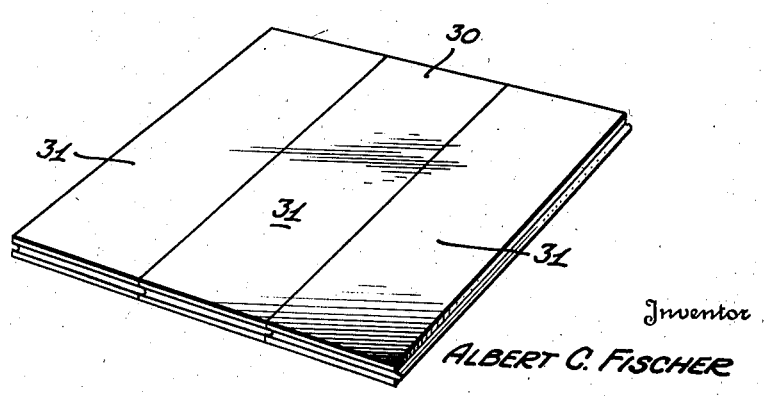
Inventor
ALBERT C. FISCHER
By Knight Bros.
Attorneys Patented Dec. 7, 1943

2,336,235

UNITED STATES PATENT OFFICE 2,336,235

STRUCTURAL UNIT

Albert C. Fischer, Chicago, Ill.

Application April 22, 1940, Serial No. 331,034

1 Claim. (Cl. 94—13)

This invention relates to tongue and groove flooring, and particularly to flooring of this type formed of a plurality of layers.

It is the object of the present invention to provide a tongue and groove flooring which may be fabricated of different layers of materials to obtain desired physical and structural effects.

It is a further object of the invention to so combine layers of different materials in the fabrication of tongue and groove flooring that the tongues and grooves in the flooring are formed directly by the displacement of the middle layer with respect to the outside layers, which result in great economies of manufacture as well as in an article of great strength.

It is a further object of the invention to provide tongue and groove floorings of multiple layers in which each of the layers is selected for its particular characteristics to combine in the fabrication of a completed flooring unit having desired properties.

It is a further object of the invention to provide a parquet flooring composed of a plurality of interengaging flooring units formed of multiple layers of material.

Other objects and purposes will appear from the more detailed description of the invention following hereinafter, taken in conjunction with the accompanying drawing, wherein:

Figure 1 is a vertical sectional view of one embodiment of the invention;

Figure 1a is a vertical sectional view of a variation of Figure 1;

Figure 2 is a vertical sectional view of another embodiment of the invention;

Figure 2a is a vertical sectional view of a variation of Figure 2;

Figure 3 is a vertical sectional view of another embodiment of the invention incorporating a metallic insert therein as the intermediate layer; and Figure 4 is a perspective view of a parquet slab composed of flooring units in accordance with the present invention.

In Figure 1 is illustrated a flooring unit composed of three superposed rectangular layers of material in which the middle layer 1 has the edges thereof displaced with respect to those on the top and bottom layers 2 and 3, respectively. Thereby a tongue 12 is formed on one edge of the unit, while a groove 13 is formed on the other edge thereof. Adjacent units may then be laid upon a floor or any other structural surface by the interengagement of the tongue of one unit with the groove of another unit, to obtain an extended surface of good structural integrity.

In the embodiment of the invention illustrated in Figure 1, the middle layer 1 may be of a rigid material such as wood, and the top layer may be of a cork rubber composition 2, while the bottom layer 3 may be made of any desired rubber composition such as hard rubber or softer rubber, and may be sponge rubber.

In the form of the invention illustrated in Figure 1a, the middle layer 1 is maintained the same, namely, wood, while the base layer is made of a hardened cementitious slab 4, while the upper layer 5 may be of rubber rather than of cork and rubber composition. If desired, the adjacent units may have the surface layers alternate in order to obtain different ornamental and structural effects.

In Figure 2, the surface layer may be a grained wood 6, while the middle layer 7 is of rubber, and the bottom layer 8 is of rubber. The three layers illustrated in this embodiment may be united by coating the wood with a rubber adhesive and vulcanizing the other two layers with the adhesive coating of the wood by the proper interposition of the layers in a suitable mold.

In Figure 2a is shown a variation of the embodiment of the invention shown in Figure 2, by the formation of a flooring unit composed of three layers of rubber, each of which may vary in physical and chemical properties. Thus, the top layer 9 may be plain rubber, while the middle layer 10 is of a harder consistency in order to rigidify the interengagement of the tongue and grooves of the flooring units. The bottom layer 11 may be of a softer grade of rubber in order to impart a desired resiliency to the structure. The top layer is of the best quality rubber in view of its surface exposure, while the two bottom layers may be of inferior quality, since the same are not in view. The same may be vulcanized in a mold.

In lieu of the rubber compositions forming the layers of the flooring unit shown in Figure 2a, these may be of cork and rubber compositions which may also be combined with any desired pigments, and vulcanized.

In Figure 3 is shown a flooring unit in which the top and bottom layers, 15 and 16, respectively, are formed of rubber compositions, while the middle layer 17 is formed of a metallic unit, such as of steel, in which the edges are bent under to provide closed ends for the groove 18 and the tongue 19 at the opposite edges of the unit. The top layer contacts with the complete upper surface 17 of the metallic core, while the bottom layer contacts with the metallic core only at the inturned edges 20 and 21. Of course, the steel core may be perforated to provide an effective interengagement of one or both layers therewith. Manufacturing economies result from the discontinuous design of the metallic core without sacrificing any essential strength factor, while an inherent resilience is imparted to the assembly.

In Figure 4 is shown a parquet flooring slab 30 composed of three units 31 of the type described above, in which the middle layer of each of the units is displaced with respect to the top and bottom layers to obtain tongues and grooves for interengagement with each other. The multiple layers of the units may be the same or they may be alternated as described above to obtain slabs of novel design and construction. The compositions of the individual units 31 of the parquet flooring may be of any of the compositions described above.

While I have described my invention as embodied in concrete form and as operating in a specific manner for purposes of illustration, it should be understood that I do not limit my invention thereto, since various modifications will suggest themselves to those skilled in the art without departing from the spirit of my invention, the scope of which is set forth in the annexed claim.

What I claim is:

A structural unit composed of three superposed layers of materials of different characteristics, with the middle layer displaced with respect to the outer layers to form a tongue and a groove on opposite edges of the unit, the middle layer being formed solely of a metallic spacer having at least one continuous surface merging into inturned edges forming a void space between the outer layers and defining the limits of the tongue and groove.

ALBERT C. FISCHER.